(12) United States Patent
Narita

(10) Patent No.: US 10,445,512 B2
(45) Date of Patent: Oct. 15, 2019

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Yuki Narita, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/032,496

(22) Filed: Jul. 11, 2018

(65) Prior Publication Data

US 2019/0018970 A1    Jan. 17, 2019

(30) Foreign Application Priority Data

Jul. 14, 2017   (JP) .................. 2017-138340

(51) Int. Cl.
*G06F 3/12* (2006.01)
*G06F 21/60* (2013.01)
*G06F 21/31* (2013.01)

(52) U.S. Cl.
CPC .......... *G06F 21/608* (2013.01); *G06F 3/1238* (2013.01); *G06F 3/1239* (2013.01); *G06F 21/31* (2013.01)

(58) Field of Classification Search
CPC .... G06F 21/608; G06F 3/1239; G06F 3/1238; G06F 21/31
See application file for complete search history.

(56) References Cited

U.S. PATENT DOCUMENTS 9,202,030 B2 * 12/2015 Yamahara ............... G06F 21/31

FOREIGN PATENT DOCUMENTS

JP    2007-290396 A    11/2007

* cited by examiner

*Primary Examiner* — Kent Yip
(74) *Attorney, Agent, or Firm* — Canon U.S.A., Inc. IP Division

(57) ABSTRACT

An apparatus and method is provided in which, in a setting of making user names case-insensitive, if a plurality of user names determined to be identical to a user name that is requested to log in is registered in an authentication database, log-in using the user name is not accepted.

8 Claims, 10 Drawing Sheets

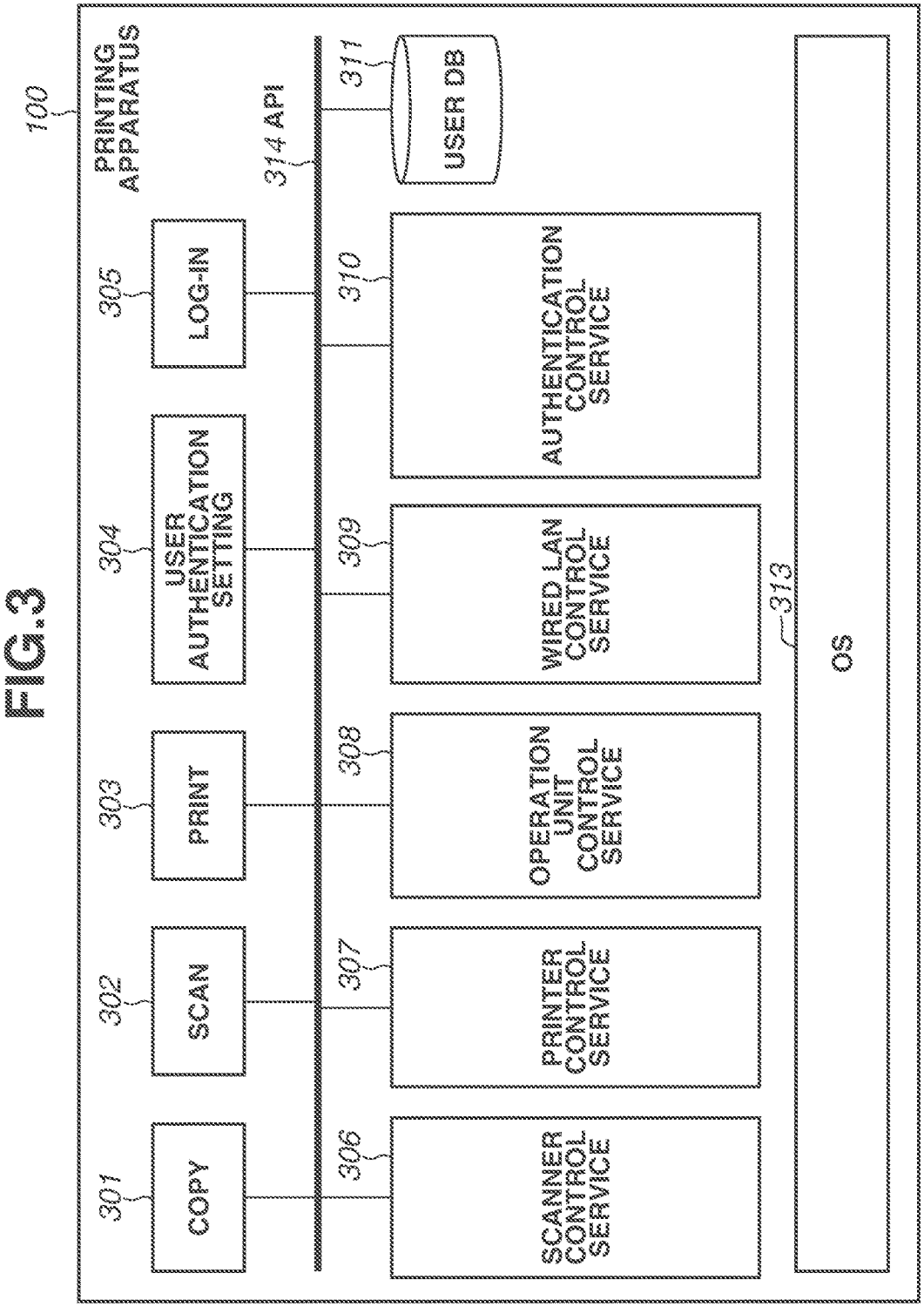

FIG.4A 401

USER NAME AUTHENTICATION
USER NAME: Alice
PASSWORD: 1234
LOG-IN ~419

FIG.4B 402

MENU
COPY 405 | SCAN 406 | PRINT 407 | USER AUTHENTICATION SETTING 410
LOG-OUT 411

FIG.4C 403

USER AUTHENTICATION SETTING SCREEN
USER AUTHENTICATION SETTING:
■ USER NAME AUTHENTICATION —412
☐ CARD AUTHENTICATION —413
☐ ICON BUTTON AUTHENTICATION —414
CASE SENSITIVITY SETTING
■ CASE-SENSITIVE ☐ CASE-INSENSITIVE —415
LOG-OUT —416

FIG.4D 404

CARD AUTHENTICATION
☐ HOLD YOUR CARD OVER CARD READER FOR AUTHENTICATION
CARD | CARD REGISTRATION 417

FIG.4E 405

ICON BUTTON AUTHENTICATION
ALICE | alice | BOB | bob
418

FIG.5

```
501
 ┌─────────────────────────────────────────────┐
 │ RECEIPT NUMBER: 0001                        │
 │ RESULT:          OK                         │
 ├─────────────────────────────────────────────┤
 │   START TIME:     2017 05/01  0:00          │
 │   END TIME:       2017 05/01  0:01          │
502│
 │   JOB OWNER NAME:                   Alice   │
 │   NUMBER OF DOCUMENT PAGES:         0001    │
 │   NUMBER OF OUTPUT PAGES:           0001    │
 │   NUMBER OF SHEETS × NUMBER OF COPIES 1 × 1 │
 │                                             │
 │                                    ( OK )   │
 └─────────────────────────────────────────────┘
                                        503
```

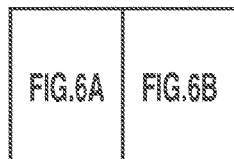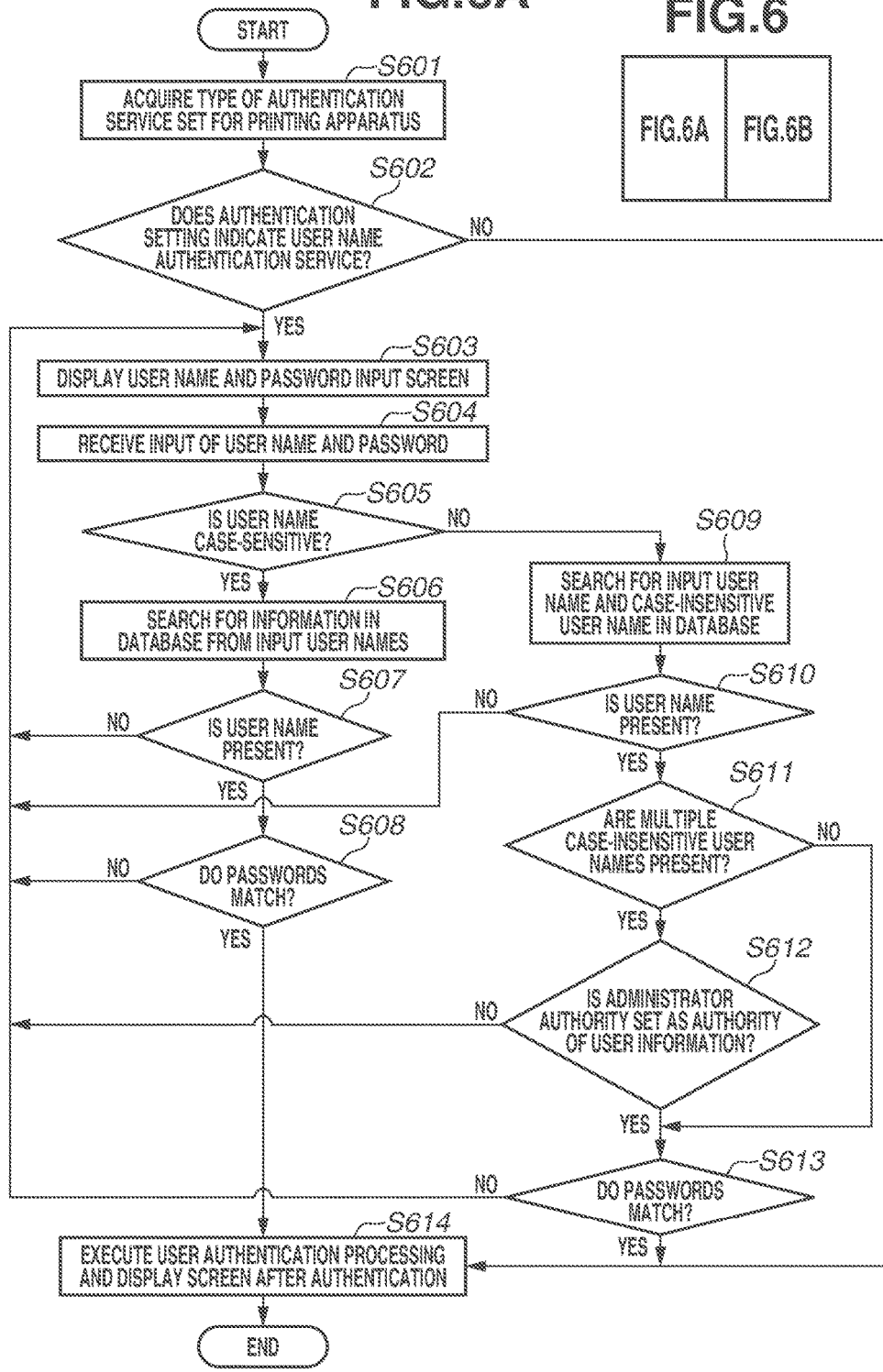

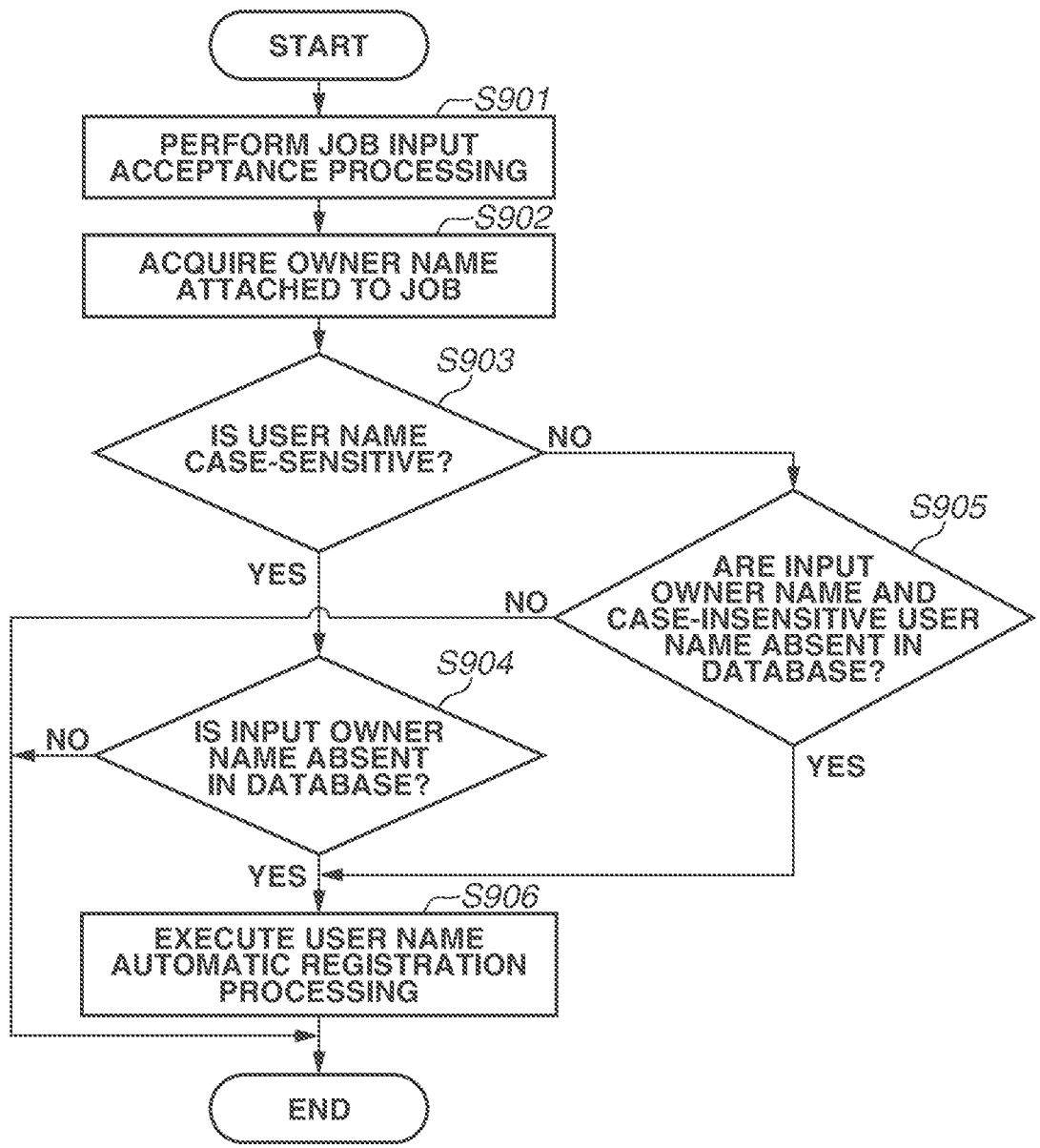

INFORMATION PROCESSING APPARATUS, CONTROL METHOD FOR INFORMATION PROCESSING APPARATUS, AND STORAGE MEDIUM

BACKGROUND OF THE INVENTION

Field of the Invention

The present invention relates to an information processing apparatus capable of switching between a case sensitivity setting and a case insensitivity setting for user identification information to be input to the information processing apparatus, a control method for the information processing apparatus, and a storage medium.

Description of the Related Art

An information processing apparatus having the following configuration has heretofore been known. That is, the information processing apparatus manages a database for storing user identification information, and displays an operation screen corresponding to each user registered in the database in a case where identification information corresponding to the identification information input to the information processing apparatus by the user is registered in the database.

Japanese Patent Application Laid-open No. 2007-290396 discloses an authentication system for performing authentication in a case-sensitive manner on authentication information.

A case sensitivity setting and a case insensitivity setting may be switched and used for user identification information (e.g., a user name). For example, in the case sensitivity setting, an uppercase user name and a lowercase user name represented by the same character string as that of the uppercase user name are registered as different users in a database. On the other hand, in the case insensitivity setting, user names represented by the same character string are registered as the same user in the database, regardless of whether the user names are uppercase or lowercase.

However, switching to the setting to the case insensitivity setting after an uppercase user name and a lowercase user name represented by the same character string as that of the uppercase user name are registered as different users in the database during the case sensitivity setting causes the following problem. That is, it is difficult for an information processing apparatus to recognize whether a user name input to the information processing apparatus corresponds to an uppercase user name or a lowercase user name stored in the database.

Accordingly, the information processing apparatus may cause, for example, a display unit to display an operation screen for each user that is different from the operation screen intended by the user who has input the user name, and thus the information processing apparatus cannot perform appropriate processing.

SUMMARY OF THE INVENTION

An information processing apparatus according to an aspect of an embodiment has the following configuration. The information processing apparatus includes a memory device that stores a set of instructions, and at least one processor that executes the set of instructions to set one of a first setting and a second setting, wherein in a case where the first setting is set, upper case letters and lower case letters of user information are distinguished, and, in a case where the second setting is set, upper case letters and lower case letters of user information are not distinguished, accept, upon registration of user identification information in a database based on the setting, an input of the user identification information, cause a display unit to display an operation screen corresponding to the accepted user identification information, in a case where the accepted user identification information corresponds to the user identification information registered in the database, and restrict, in a case where a plurality of pieces of identification information registered in the database had been treated as a plurality of pieces of identification information of a plurality of users in a state where the first setting had set and are treated as identification information of the same user in a state where the second setting is set, the display of the operation screen upon acceptance of any one of the plurality of pieces of identification information in the state where the second setting is set.

Further features will become apparent from the following description of exemplary embodiments with reference to the attached drawings.

BRIEF DESCRIPTION OF THE DRAWINGS

FIG. 3 illustrates a software configuration and a data area managed by software.

FIGS. 4A, 4B, 4C, 4D, and 4E each illustrate an authentication screen and a user authentication setting screen.

FIG. 5 illustrates an example of job information attached to a print job.

FIG. 9 illustrates a user automatic registration processing flow.

DESCRIPTION OF THE EMBODIMENTS

Exemplary embodiments for carrying out the embodiments will be described below with reference to the drawings and a table.

In a first exemplary embodiment, processing for a user to log in a printing apparatus 100 as an information processing apparatus will be described. In the present exemplary embodiment, the term "log-in processing" refers to processing in which, in response to an input of identification information for identifying a user or an instruction for designating a user, the information processing apparatus provides the user with an operation screen associated with the user corresponding to such input identification information or instruction. The printing apparatus 100 is an image forming apparatus having a print function. The printing apparatus 100 can have a scan function for scanning an image, a transmission function for transmitting an image to a network, a copy function, or the like. Examples of the printing apparatus 100 as the information processing apparatus will be described below. However, the printing apparatus 100 is not limited to these examples, but instead can be a personal computer (PC) or a mobile terminal.

Figure 1:
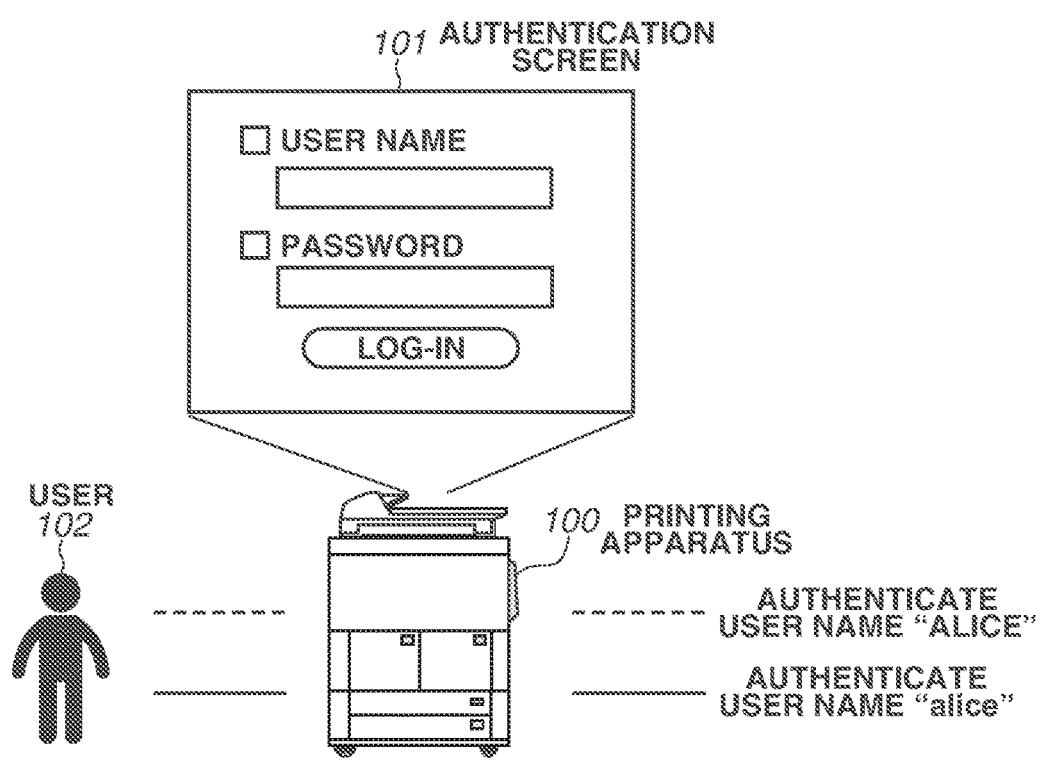
FIG. 1 is a simplified diagram illustrating a configuration of a system.

An example of the log-in processing according to the present exemplary embodiment will now be described with reference to FIG. 1. In a state where a user has not logged in the printing apparatus 100, the printing apparatus 100 causes a display unit of the printing apparatus 100 to display an authentication screen 101. The authentication screen 101 is an input screen for a user to input user identification information. On the authentication screen 101, an input field used for the user to input user identification information (e.g., a user name) and an input field used for the user to input a password are displayed. While FIG. 1 illustrates an example in which the input of a password is required for log-in, the log-in processing can be performed without requiring the input of a password.

The user can use a character string, such as "ALICE", as a user name. As described below, the printing apparatus 100 according to the present exemplary embodiment can switch between a case sensitivity setting and a case insensitivity setting for a user name. In a case where the case sensitivity setting is set, upper case letters and lower case letters of user information are distinguished, and, in a case where the insensitivity setting is set, upper case letters and lower case letters of user information are not distinguished. When the case insensitivity setting is made for the printing apparatus 100, a user name "alice" which is input using only lowercase letters, a user name "Alice" which includes both uppercase and lowercase letters, and the like are also recognized as the user name of the same user "ALICE". On the other hand, when the case sensitivity setting is made for the printing apparatus 100, "ALICE", "alice", and "Alice" are recognized as user names of different users.

Hardware Configuration of Printing Apparatus

Figure 2:
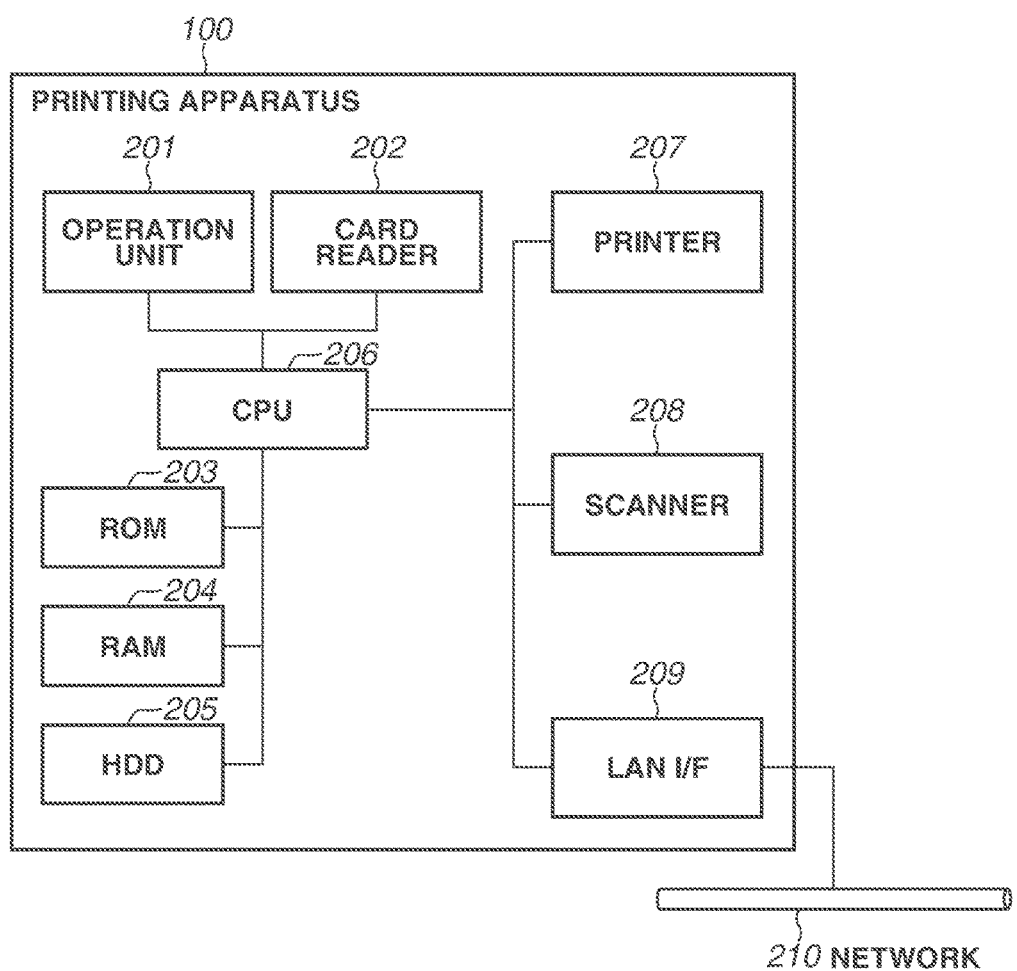
FIG. 2 illustrates a hardware configuration.

The hardware configuration of the printing apparatus 100 according to the present exemplary embodiment will be described with reference to FIG. 2.

A printer 207 performs processing for forming an image corresponding to a print job received via a network 210 and outputting the image onto a sheet. A scanner 208 performs processing for optically scanning a document image.

An operation unit 201 includes a display unit and an input key used for a user to input identification information on the input screen displayed on the display unit. The input key is not necessarily configured as hardware, but instead can be implemented by causing the display unit to display an input unit such as a soft keyboard.

The display unit of the operation unit 201 displays an authentication screen (an input screen) 401 to be described below with reference to FIG. 4. The authentication screen 401 is a screen for inputting a user name and a password. The display unit displays a selection screen 418 for selecting a user who logs in the printing apparatus 100 as described below with reference to FIG. 4. Further, the display unit displays an operation screen 402 used for a user to operate the printing apparatus 100. The user can make a setting for print processing or scan processing through the operation screen, and can also make an instruction to execute such processing. An administrator user can operate the operation screen 402 to make a setting for the type of the log-in processing to be executed by the printing apparatus 100, and make a case sensitivity setting or a case insensitivity setting for a user name.

A local area network (LAN) interface (I/F) 209 connects the printing apparatus 100 to the network 210. The LAN I/F 209 transmits image data or information to an external device on the network 210, and receives various information from the external device on the network 210. While the present exemplary embodiment illustrates an example in which the network 210 is a local area network (LAN), the Internet and the like can also be used. The network 210 can be a wired or wireless network, and the communication method is not particularly limited.

A card reader 202 acquires, from a memory device that is different from the memory device of the printing apparatus 100, identification information stored in the memory device. The memory device is, for example, an IC card or a mobile terminal including an integrated circuit. An example in which an IC card is used as the memory device will be described below. An IC card stores a card ID as unique identification information allocated to the IC card. The printing apparatus 100 stores the card ID in a database in association with a user name. The printing apparatus 100 causes the card reader 202 to read the card ID stored in the IC card and executes authentication processing and log-in processing based on the read card ID. A method for communication between the IC card and the card reader 202 is not particularly limited. For example, a communication using a near-field communication technique, such as International Organization for Standardization (ISO)/International Electrotechnical Commission (IEC)18092 (Near Field Communication Interface and Protocol (NFCIP)-1) or ISO/IEC 21481 (NFCIP-2) can be established.

A central processing unit (CPU) 206 controls components constituting the printing apparatus 100. The CPU 206 loads a control program stored in a read only memory (ROM) 203 and performs various control processing such as read control processing and transmission control processing. A random access memory (RAM) 204 is used as a temporary storage area, such as a main memory or a work area for the CPU 206. A hard disk drive (HDD) 205 stores image data, various programs, or various data to be described below.

Software Configuration

A software configuration of the printing apparatus 100 according to the present exemplary embodiment will be described with reference to FIG. 3. Each component illustrated in FIG. 3 is implemented in such a manner that the CPU 206 executes programs stored in the ROM 203.

The printing apparatus 100 includes, as applications, a copy application 301, a scan application 302, a print application 303, a user authentication setting application 304, and a log-in application 305.

As applications, the copy application 301, the scan application 302, and the print application 303 provide a copy function, a scan function, and a print function, respectively.

The user authentication setting application 304 provides a setting function for authentication. In the present exemplary embodiment, the user authentication setting application 304 causes the display unit to display an authentication setting screen 403 illustrated in FIG. 4.

The log-in application 305 provides a function for logging in the printing apparatus 100, performs the registration of a new user, change of user information, and the like using information stored in a user database (DB) 311, and manages a logged-in user.

The applications described above communicate with various control services through an application program interface (API) 314, and the applications start.

A scanner control service 306 controls the scanner 206 according to an instruction from the scan application 302. A printer control service 307 controls the printer 207 according to an instruction from the copy application 301 or the print application 303.

An operation unit control service 308 controls input and output of an instruction or a notification through the operation unit 201. The operation unit control service 308 performs display control for causing the display unit of the operation unit 201 to display the authentication screen 101 according to an instruction from the log-in application 305. The operation unit control service 308 also performs display control for causing the display unit to display a user selection screen 405 or a card authentication screen 404 according to an instruction from the log-in application 305. Further, the operation unit control service 308 performs display control for causing the display unit to display the operation screen (authentication setting screen) 403.

A wired LAN control service 309 controls the LAN I/F 209 and performs communication control for communication between the printing apparatus 100 and the external device via the network 210.

An authentication control service 310 performs authentication, control for executing the authentication processing according to an instruction from the user authentication setting application 304 or the log-in application 305.

The user DB 311 is a database for storing user identification information. The user identification information is, for example, a user name. The user DB 311 stores user authentication information and card identification information in association with the user identification information. The user authentication information is, for example, a password. The card identification information is unique identification information stored in the IC card.

While the present exemplary embodiment illustrates an example in which the printing apparatus 100 stores the user DB 311 in the HDD 205 and the authentication control service 310 executes the authentication processing, embodiments are not limited to this example. An authentication server connected to the printing apparatus 100 via the network 210 can execute the authentication processing.

An operating system (OS) 313 is a base application for providing an environment for allowing each component illustrated in FIG. 3 to operate.

Authentication Service

The authentication service provided by the log-in application 305 will be described. The log-in application 305 according to the present exemplary embodiment provides three types of authentication services, i.e., a user name authentication service, a card authentication service, and an icon authentication service. While the present exemplary embodiment illustrates an example in which the log-in application 305 provides three types of authentication services, some of the authentication services can be provided by different applications. For example, the authentication services can be provided by separate applications. Hereinafter, a content to be registered in the user DB 311 used for each authentication service will be described first and then the authentication processing to be executed by each authentication service will be described.

User DB 311

A below table shows an example of information registered in the user DB 311.

| User Name | Password | Card ID | Button Icon | Authority |
|---|---|---|---|---|
| Alice | 1234 | 8765 | Alice.png | Administrator |
| Bob | 5678 | 4321 | Bob.png | General |

A "user name" represents identification information for identifying a user. A "password" represents authentication information used for the authentication processing. A "card ID" represents identification information unique to each IC card. The card ID is stored in association with a user ID.

A "button icon" represents image information used for the icon authentication service described above. Each user name is stored in association with an image (icon). In the icon authentication service, icons respectively corresponding to user names are displayed in a list on the display unit. Selecting an icon enables a user to log in the printing apparatus 100 as the user having the user name associated with the selected icon.

An "authority" represents authority information attached to each of the users corresponding to the respective user names. A user having an administrator authority can make a setting for enabling or disabling each authentication service, and make a case sensitivity setting or a case insensitivity setting in user name authentication processing as described below. The user having the administrator authority can also register user information in the user DB 311. The execution of such processing by a user to which a general authority is attached is restricted. However, the general user can be allowed to perform the registration of a password or a card ID used by the user himself/herself, setting of an icon image, and the like.

User Name Authentication Service

Each authentication service will be described. The user name authentication service is a service for performing the authentication processing to check whether a user name and a password which are input by a user on the authentication screen 101 correspond to a combination of a user name and a password registered in the user DB 311. When the authentication is successful, the user corresponding to the received user name is allowed to log in the printing apparatus 100. After log-in, an operation screen corresponding to the authenticated user is displayed on the display unit.

For example, as illustrated in FIG. 4A, a user who uses the printing apparatus 100 inputs a user name in a user name input field on the authentication screen 401 displayed on the display unit. Further, the user inputs a password in a password input field. After inputting the user name and the password, the user presses a log-in button 419. When information about the input user name and password is registered in the user DB 311, the operation screen 402 is displayed. On the operation screen 402, a display language, a background image, a button layout, and the like can be customized for each user. In a case where the authentication is successful, an operation screen corresponding to the authenticated user is displayed.

In a case where the input user name is not present in the user DB 311, or in a case where the input password does not match the password registered in the user DB 311, the authentication screen 101 is displayed as an authentication error.

Assume in the present exemplary embodiment that an administrator having an administrator authority preliminarily registers a user name and a password for the printing apparatus 100 in the user DB 311. Alternatively, a general user who does not have an administrator authority can be allowed to register a password in the user DB 311.

Card Authentication Service

The card authentication service is a service for performing the authentication processing to check whether identification information (e.g., a card ID) acquired from a memory device, such as an IC card, corresponds to identification information registered in the user DB 311.

For example, when a setting for performing authentication by the card authentication service is made, as illustrated in FIG. 4D, the card authentication screen 404 for prompting the user to hold the IC card over the card reader 202 is displayed, on the display unit in a state where the user has not logged in the printing apparatus 100.

When the user holds his/her own IC card over the card reader 202 of the printing apparatus 100, the card reader 202 acquires the card ID from the IC card. Next, the log-in application 305 determines whether the acquired card ID is registered in the user DB 311. In a case where the card ID is registered in the user DB 311, it is determined that the authentication is successful and the user corresponding to the user name store in the user DB 311 in association with the card ID is allowed to log in the printing apparatus 100. On the other hand, in a case where the card ID is not registered, in the user DB 311, the card authentication screen 404 is displayed as an authentication error.

Icon Authentication Service

The icon authentication service is an authentication service for causing the display unit to display a selection screen for the user corresponding to the user name registered in the user DB 311 to allow the user selected using the selection screen to log in the printing apparatus 100.

For example, the log-in application 305 causes icons respectively corresponding to the user names present in the user DB 311 to be displayed. FIG. 4E illustrates an example of the selection screen 418 on which the icons are displayed. The user selects an icon corresponding to the user name of the user himself/herself from among the icons displayed on the selection screen 418, thereby making it possible to execute the authentication processing.

A case where a user automatic registration function used when the icon authentication service is enabled will now be described. The user inputs a print job to the printing apparatus 100 from, for example, a PC. FIG. 5 illustrates an example of job information input to the printing apparatus 100 from the PC in association with the print job. The printing apparatus 100 checks a job owner name 502 of the input job. When the job owner name is not registered in the user DB 311, the job owner name is registered as a user name in the user DB 311. In this case, only the user name is registered in the user DB 311. Accordingly, when a password is to be set, the user needs to manually register the password in the user DB 311.

Authentication Setting Processing

The authentication setting processing will be described with reference to FIG. 4C. Assume in the present exemplary embodiment that the authentication setting screen 403 can be displayed when an administer user having an administrator authority logs in the printing apparatus 100.

The administrator user can make a setting for enabling or disabling each authentication service by using the authentication setting screen 403. A plurality of authentication services may be enabled. If one of the authentication services is enabled, other specific authentication services may be disabled.

The administrator can also make a setting for performing authentication in a case-sensitive manner or a case-in sensitive manner for a user name by using the authentication setting screen 403. In a case where a function for performing authentication in a case-sensitive manner is enabled, user names which are represented by the same character string and in which lowercase and uppercase letters of at least a part of the character string are different are treated as user names of different users.

For example, when the case insensitivity setting is enabled, the user name "alice" which is input using only lowercase letters, the user name "Alice" which includes both uppercase and lowercase letters, and the like are also recognized as the user name of the same user "ALICE". On the other hand, when the case sensitivity setting is enabled, "ALICE", "alice", and "Alice" are recognized as user names of different users.

In the present exemplary embodiment, in a case where the case sensitivity setting for a user name is made, registration processing in a case-sensitive manner is also performed in the user name automatic registration in the icon authentication service. On the other hand, when the case insensitivity setting is made, the registration processing is performed in a case-insensitive manner.

User Registration Processing

Figure 7:
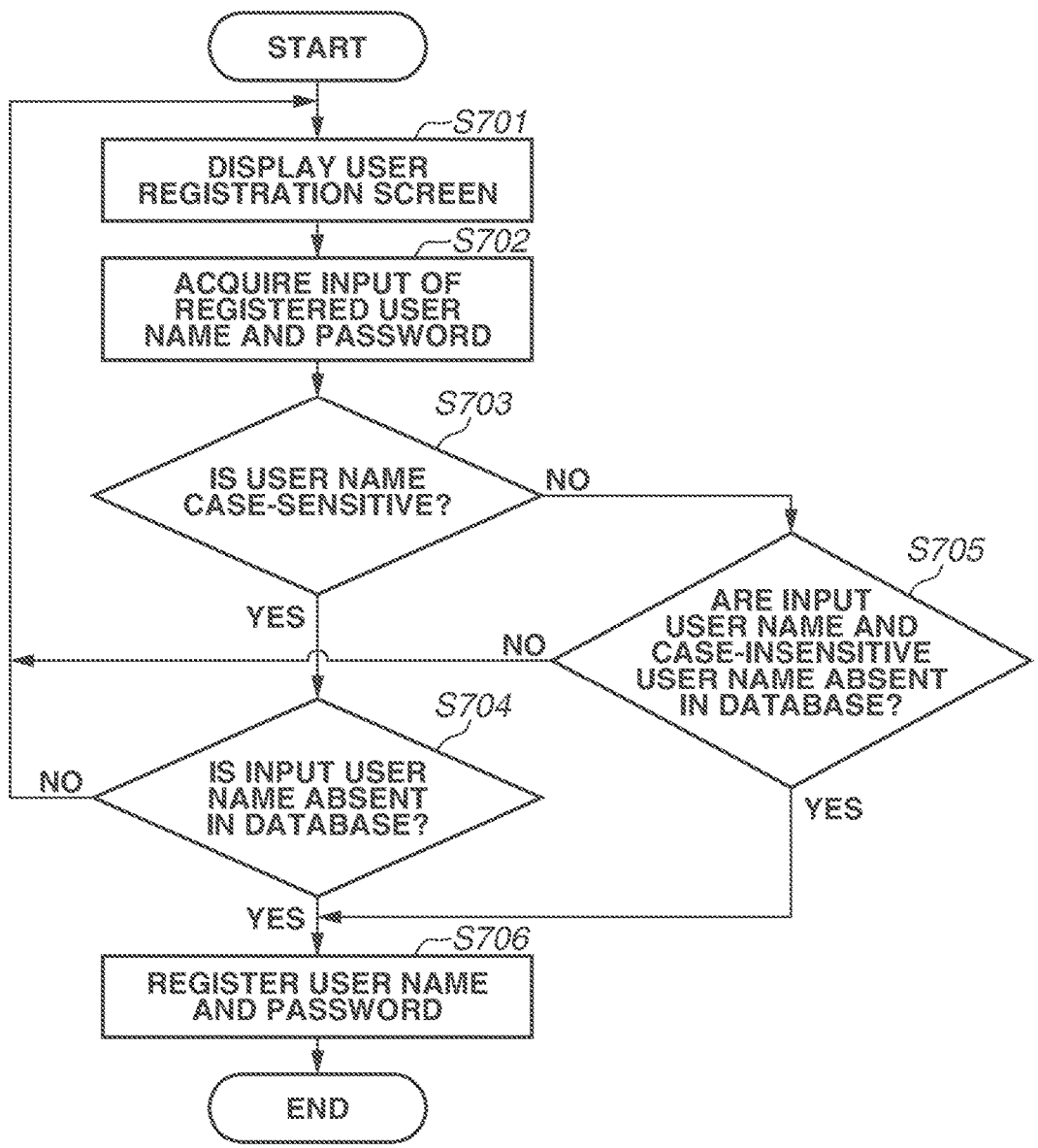
FIG. 7 illustrates a user name registration processing flow.
Figure 8:
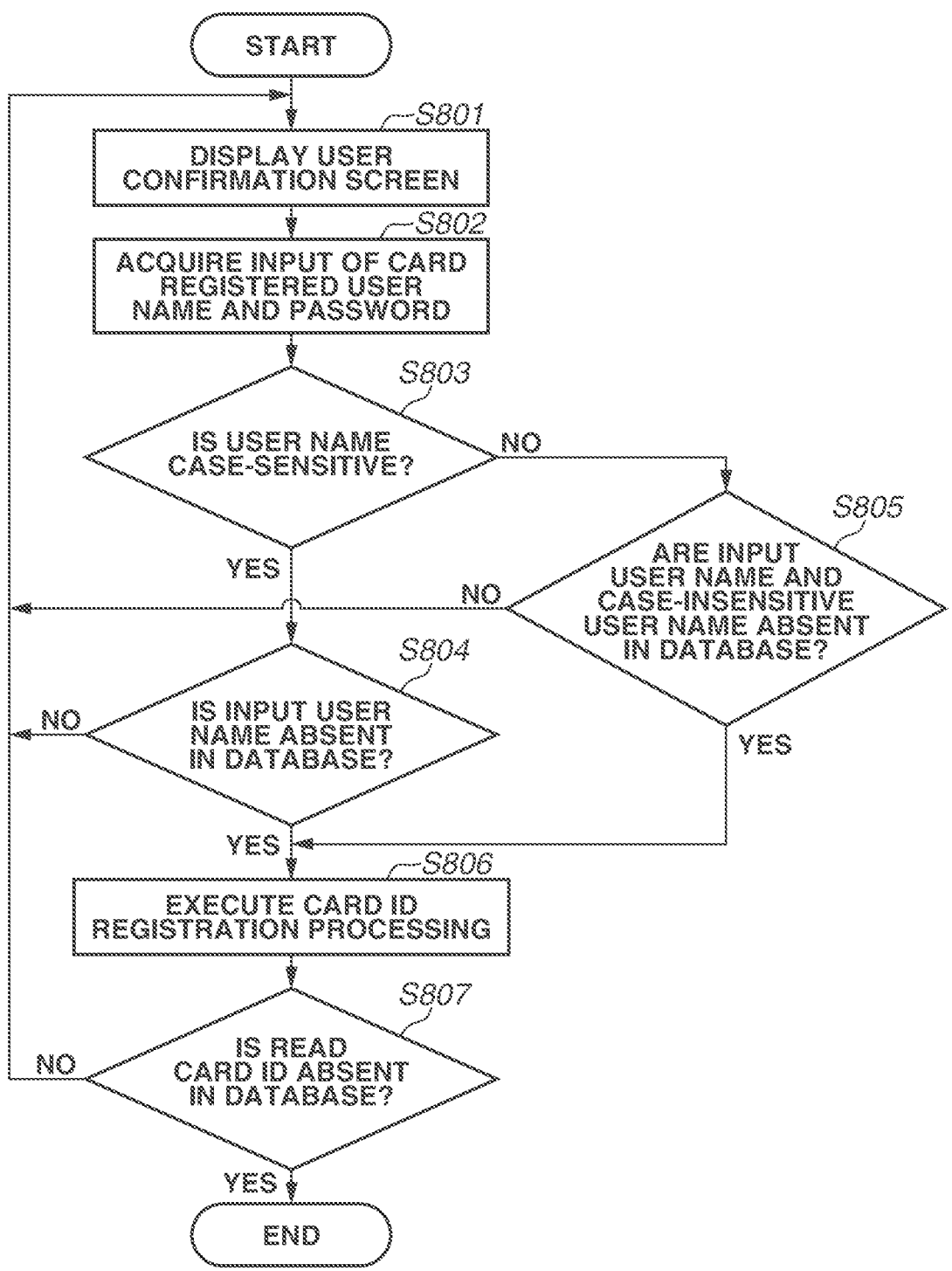
FIG. 8 illustrates a card registration processing flow.

The user registration processing according to the present exemplary embodiment will be described with reference to FIGS. 7 to 9. In the present exemplary embodiment, procedures illustrated in FIGS. 7 to 9 are implemented in such a manner that the CPU 206 loads programs stored in the ROM 203 and executes the programs. A part of the processing can be implemented by hardware.

As the user registration processing, manual registration processing, card ID registration processing, and automatic registration processing will be described below.

The manual registration processing is processing in which the administrator manually registers a user name and a password, in the user DB 311. The card ID registration processing is processing for associating a card ID with a user account for which a user name and a password are already registered. The automatic registration processing is processing for automatically registering, when a job is input to the printing apparatus 100, an owner name of the job as a user name in the user BD 311.

Manual Registration Processing

First, processing in which the administrator manually registers a user name and a password in the user DB 311 will be described with reference to FIG. 7.

In step S701, the CPU 206 causes the display unit to display a user account registration screen when the display of the user account registration screen is instructed in a state where the administrator logs in the printing apparatus 100.

When the administrator determines the input user name and password on the registration screen, in step S702, the CPU 206 acquires the determined user name and password. The determination of the input user name and password can be made in such a manner that, for example, the administrator presses an enter button displayed on the registration screen.

In step S703, the CPU 206 determines whether the user name is case-sensitive.

In Case of Case Sensitivity Setting

In a case where the user name is case-sensitive (YES in step S703), in step S704, the CPU 206 determines whether the user name acquired in step S702 is already registered in the user DB 311 after checking each user name in a case-sensitive manner. For example, "ALICE", "alice", and "Alice" are determined to be different user names.

In a case where the user name is already registered, i.e., the user name is not absent in the user DB 311 (NO in step S704), the user name registration processing is not executed. On the other hand, in a case where the user name is not registered, i.e., the user name is absent (YES in step S704), in step S706, the user name and the password acquired in step S702 are registered in the user DB 311.

In Case of Case Insensitivity Setting

In a case where the user name is case-insensitive (NO in step S703), in step S705, the CPU 206 determines, in a case-insensitive manner, whether the user name acquired in step S702 is already registered in the user DB 311. Specifically, even if different user names are obtained in a case of the case-sensitive setting, it is determined that the user name that is requested to be registered is present, if the same user name is found, in a case of the case insensitivity setting. For example, in a case where the registration of "ALICE" is requested as a user name, if the user name "alice" or "Alice" is already registered in the user DB 311, it is determined that the same user name is already registered.

In a case where it is determined in step S705 that the user name that is requested to be registered is not absent in the user DB 311 (NO in step S705), the user name registration processing is not executed. On the other hand, in a case where it is determined that the user name that is requested to be registered is not registered (is absent) in the user DB 311 (YES in step S705), the registration processing is carried out (S706). In the present exemplary embodiment, in step S706, the user name with the same uppercase and lowercase letters as those of the user name input on the registration screen is registered in the user DB 311. In this case, however, all text of the input user name can be converted into uppercase letters to be registered as a user name, or can be converted into lowercase letters to be registered as the user name.

Card ID Registration Processing

Next, processing for registering a card ID in the user DB 311 will be described with reference to FIG. 8.

If a card registration button 417 is selected, in step S801, the CPU 206 causes the display unit to display a user confirmation screen.

When a user name and a password are input and determined on the user confirmation screen, in step S802, the CPU 206 acquires the determined user name and password. The determination of the input, user name and password can be made in such a manner that, for example, the user presses an enter button displayed on the user confirmation screen.

In step S803, the CPU 206 determines whether the user name is case-sensitive.

In Case of Case Sensitivity Setting

In a case where the user name is case-sensitive (YES in step S803), in step S804, the CPU 206 determines whether the combination of the user name and the password acquired in step S802 is registered in the user DB 311. In this case, the user name is determined in a case-sensitive manner. For example, "ALICE", "alice", and "Alice" are determined to be different user names.

In a case where the combination of the user name and the password input on the user confirmation screen is registered, i.e., the combination of the user name and the password input on the user confirmation screen is not absent in the user DB 311 (NO in step S804), the CPU 206 determines that a registration error has occurred, and the processing returns to step S801.

On the other hand, in a case where the combination of the input user name and password is not registered, i.e., the combination of the input, user name and password is absent in the user DB 311 (YES in step S801), the printing apparatus 100 prompts the user to hold the IC card to be registered over the card reader 202. When the IC card is held over the card reader 202, the card reader 202 acquires the card ID stored in the IC card. In step S806, the CPU 206 acquires the card ID from the card reader 202.

In step S807, the CPU 206 checks whether the card ID acquired in step S806 is registered in the user DB 311. In a case where the card ID is absent (YES in step S807), the acquired card ID is registered in the user DB 311 in association with the user name input on the user confirmation screen. In a case where the card ID acquired in step S806 is not absent in the user DB 311 (NO in step S807), the CPU 206 determines that a registration error has occurred, and the processing returns to step S801.

In Case of Case Insensitivity Setting

In a case where the user name is case-insensitive (NO in step S803), in step S805, the CPU 206 determines whether the user name and the password acquired in step S802 are registered in the user DB 311. In this case, the CPU 206 determines the user name in a case-insensitive manner. For example, "ALICE", "alice", and "Alice" are determined to be the same user name.

In a case where the combination of the user name and the password input on the user confirmation screen is registered (is not absent) in the user DB 311 (NO in step S805), the CPU 206 determines that a registration error has occurred, and the processing returns to step S801.

On the other hand, in a case where the combination of the user name and the password input on the user confirmation screen is not registered (is absent) in the user DB 311 (YES in step S805, the CPU 206 executes the processing of steps S806 and S807 described above.

Processing Flow in User Automatic Registration

Lastly, processing for automatically registering, when a job is input to the printing apparatus 100, an owner name of the job as a user name in the user DB 311 will be described with reference to FIG. 9.

In step S901, the CPU 206 accepts a job input. Then, in step S902, the CPU 206 acquires an owner name attached to the accepted job. The owner name of the job is information to be attached to the job by, for example, a PC used to input the job to the printing apparatus 100. The owner name is identification information for identifying the user who has instructed to execute the job.

In step 3903, the CPU 206 determines whether the user name is case-sensitive.

In Case of Case Sensitivity Setting

In a case where the user name is case-sensitive (YES in step S903), in step S904, the CPU 206 determines whether the user name that is identical to the owner name acquired in step S902 is registered in the user DB 311. In this case, the user name is determined in a case-sensitive manner. For example, "ALICE", "alice", and "Alice" are determined to be different user names.

In a case where the user name that is identical to the owner name is registered, i.e., the user name that is identical to the owner name is not absent in the user DB 311 (NO in step S904), the processing ends without executing the automatic registration. On the other hand, in a case where the user name that is identical to the owner name is not registered, i.e., the user name that is identical to the owner name is absent in the user DB 311 (YES in step S304), in step S906, the owner name acquired in step S902 is registered as a user name of a new user in the user DB 311.

In Case of Case Insensitivity Setting

In a case where the user name is case-insensitive (NO in step S903), in step 3905, the CPU 206 determines whether the user name that is identical to the owner name acquired in step S902 is registered in the user DB 311. In this case, the CPU 206 determines the user name in a case-insensitive manner. For example, "ALICE", "alice", and "Alice" are determined to be the same user name.

In a case where it is determined that the user name that is identical to the owner name is registered, i.e., the user name that is identical to the owner name is not absent in the user DB 311 (NO in step S905), the processing ends without executing the user automatic registration processing. On the other hand, in a case where it is determined that the user name that is identical to the owner name is not registered (is absent) in the user DB 311 (YES in step S905), the processing of step S906 described, above is executed.

Description of Authentication Processing Flow

Figure 6B:
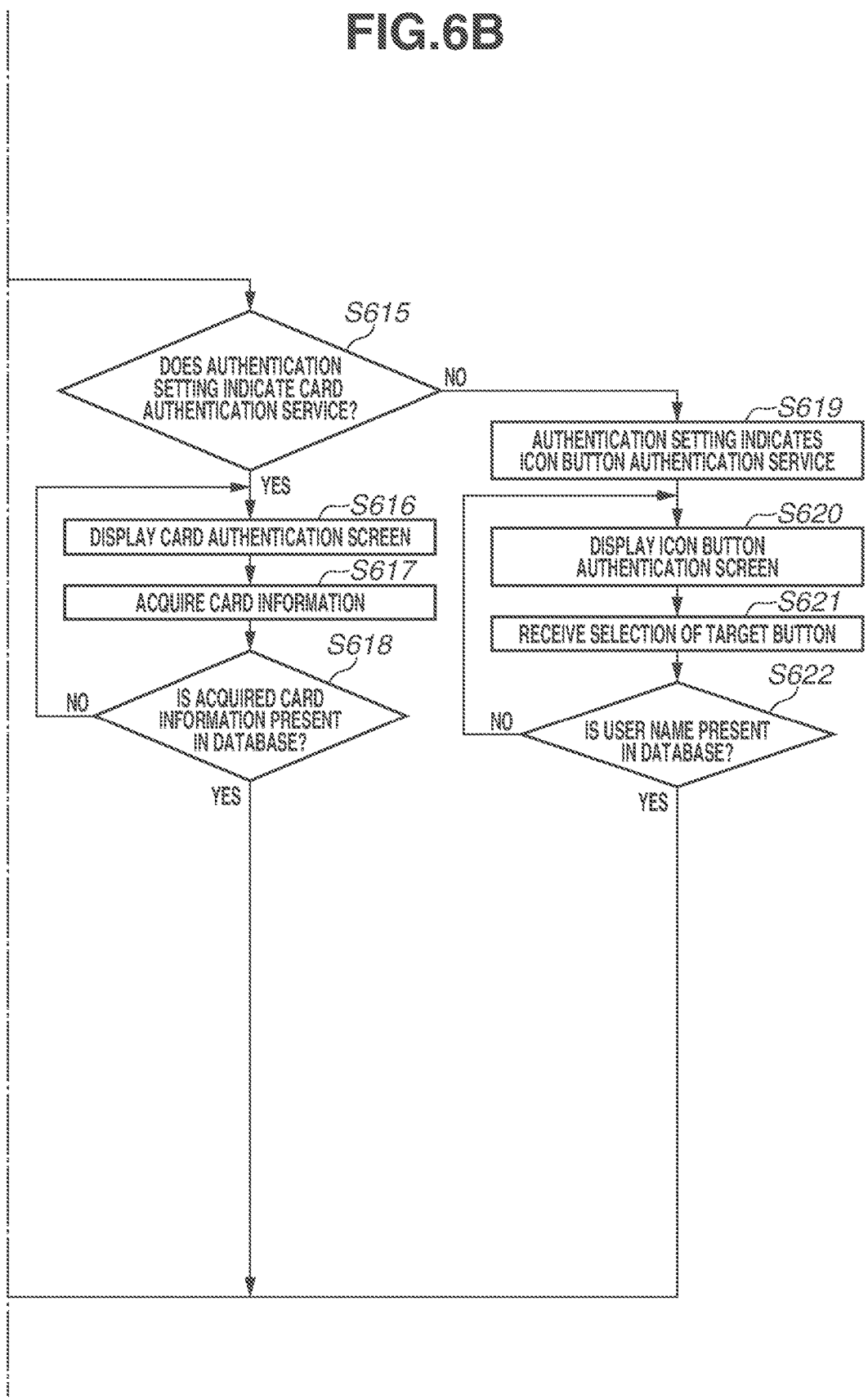
FIG. 6, composed of FIG. 6A and FIG. 6B, illustrates a user authentication processing flow.

The authentication processing according to the present exemplary embodiment will be described with reference to FIG. 6, which is composed of FIG. 6A and FIG. 6B. In the present exemplary embodiment, the procedure illustrated in FIG. 6 is implemented in such a manner that the CPU 206 loads programs stored in the ROM 203 and executes the programs. A part of the processing can be implemented by hardware.

Processing from step S601 to step S613 illustrated in FIG. 6A corresponds to the authentication processing by the user name authentication service. Processing from step S615 to step S618 illustrated in FIG. 6B corresponds to the authentication processing by the card authentication service. Processing from step S619 to step S622 illustrated in FIG. 6B corresponds to the authentication processing by the icon authentication service.

Processing Flow in User Name Authentication Method

The authentication processing by the user name authentication service will now be described. In step S601, the CPU 206 acquires the type of the authentication service set to the printing apparatus 100.

In step S602, the CPU 206 determines whether the acquired type of the authentication service corresponds to the user name authentication service.

In a case where the CPU 206 determines that the acquired type of the authentication service corresponds to the user name authentication service (YES in step S602), the processing proceeds to step S603, In step S603, the CPU 206 displays the authentication screen 401 for inputting a user name and a password.

When the log-in button 419 is pressed, in step S604, the CPU 206 performs acceptance processing for accepting the input of the user name and the password.

Then, in step S605, the CPU 206 determines whether the user name is case-sensitive.

In Case of Case Sensitivity Setting

As a result of determination in step S605, in a case where the user name is case-sensitive (YES in step S605), in step S606, search processing for searching for the input user name in the user DB 311 is carried out. In this case, the CPU 206 searches for the same user name after checking each user name in a case-sensitive manner.

In step S607, the CPU 206 checks each user name in a case-sensitive manner and then determines whether the user name that is identical to the input user name is present in the user DB 311 (in S607).

In a case where the user name that is identical to the input user name is present in the user DB 311 (YES in step S607), in step S608, the CPU 206 determines whether the password registered in the user DB 311 in association with the user name matches the password input in step S604.

In a case where the CPU 206 determines that the passwords match, in step S614, the CPU 206 determines that the authentication is successful and causes the display unit to display the operation screen 402 corresponding to the authenticated user.

On the other hand, in a case where the input user name is not present in the user DB 311 (NO in step S607), or in a case where the passwords do not match (NO in step S608), the CPU 206 determines that an authentication error has occurred, and the processing returns to step S603 to display the authentication screen 401.

In Case of Case Insensitivity Setting

As a result of determination in step S605, in a case where the user name is case-insensitive, in step S609, search processing for searching for the input user name in the user DB 311 is carried out. In this case, the CPU 206 searches for the user name that is identical to the user name input on the authentication screen 401 in the user DB 311, after checking each user name in a case-sensitive manner. Further, the CPU 206 searches, in the user DB 311, for the user name which is represented by a character string that matches the character string of the user name input on the authentication screen 401 and includes different uppercase and lowercase letters from those of the input user name.

In step S610, the CPU 206 determines, in a case-insensitive manner, whether the user name that is identical to the input user name is present in the user DB 311.

In step S610, in a case where it is determined that the same user name is present (YES in step S610), in step S611, the CPU 206 determines whether a plurality of user names each of which is represented by a character string that matches the character string of the user name and includes different uppercase and lowercase letters from those of the user name is present in the user DB 311. For example, when "ALICE" is input as a user name on the authentication screen 401 and "ALICE" is detected in the user DB 311, it is determined whether "alice" or "Alice" is registered in addition to "ALICE" in the user DB 311.

User names, which include different uppercase and lowercase letters, respectively, and are represented by the same character string, are registered as different user names in the user DB 311 in a first setting for case sensitivity, while each treated as the user name of the same user in a second setting for case insensitivity.

In step S611, a plurality of user names as described above may be registered in the user DB 311 in a case where, for example, a plurality of user names is registered as different user names in a state where the first setting is made and then the setting is switched to the second setting.

In a case where a plurality of user names which includes different uppercase and lower case letters and is represented by the same character string is not present in the user DB 311 (NO in step S611), in step S613, the CPU 206 determines whether the passwords match. Specifically, it is determined whether the password registered in the user DB 311 in association with the input user name matches the password input in step S604.

If the CPU 206 determines that the passwords match (YES in step S613), the CPU 206 determines that the authentication is successful and causes, in step S614, the display unit to display the operation screen 402 corresponding to the authenticated user.

On the other hand, in step S611, in a case where the CPU 206 determines that a plurality of user names which includes different uppercase and lower case letters, respectively, and is represented, by the same character string is registered in the user DB 311 (YES in step S611), in step S612, the CPU 206 determines whether the plurality of user names includes a user name associated with an administrator authority.

In step S612, in a case where it is determined that the user name associated with the administrator authority is present (YES in step S612), the CPU 206 performs the processing of step S613 described above. In this case, the CPU 206 determines whether the password corresponding to the user name associated with the administrator authority among the plurality of detected user names matches the input password.

In step S610, in a case where it is determined that the user name is not present (NO in step S610), the CPU 206 determines that an authentication error has occurred, and the processing returns to step S603.

In step S612, in a case where it is determined that the user name associated with the administrator authority among the plurality of user names described above is not present (NO in step S612), the CPU 206 determines that an authentication error has occurred, and the processing returns to step S603.

In step S613, in a case where the passwords do not match (NO in step S613), the CPU 206 determines that an authentication error has occurred, and the processing returns to step S603.

According to the processing described above, in the setting in which user names are case-insensitive, in a case where a plurality of user names which includes different uppercase and lowercase letters, respectively, and is represented by the same character string is registered in the user DB 311, it can be determined that an authentication error has occurred except for a predetermined case. Accordingly, the display of the operation screen is restricted. Thus, the printing apparatus 100 can prevent display of an operation screen for each user that is different from the operation screen intended by the user who has input the user name.

The predetermined case is a case where any one of a plurality of user names, which includes different uppercase and lower case letters, respectively, and is represented by the same character string, is a user name of an administrator. Even when a plurality of user names is registered, the administrator is allowed to log in the printing apparatus 100, and thus it is guaranteed that the administrator can switch the setting from the case insensitivity setting to the case sensitivity setting, or change the administrator name.

Processing Flow in Card Authentication Service

Next, a processing flow in a card authentication method will be described. In step S602, in a case where the CPU 206 determines that the user name authentication is not set as the authentication method, in step S615, the CPU 206 determines whether a card authentication method is set as the authentication method. If the CPU 206 determines that the card authentication method is set, the CPU 206 executes the processing from step S616 to step S618.

In step S616, the CPU 206 causes the display unit to display the card, authentication screen 404 and waits until an IC card is held over the card reader 202.

When the IC card is held over the card reader 202, in step S617, the CPU 206 acquires the card ID stored in the IC card.

In step S616, the CPU 206 determines whether the card ID acquired in step S617 is registered in the user DB 311. In a case where the card ID is not registered (NO in step S618), the CPU 206 determines that an authentication error has occurred, and the processing returns to step S616. On the other hand, in step S618, in a case where it is determined that the card ID is registered (YES in step S618), in step S614, the CPU 206 determines that the authentication is successful and causes the display unit to display the operation screen for the user corresponding to the user name associated with the card ID.

In the authentication processing by the card authentication service, the authentication processing is performed using a card ID, thereby enabling the authentication processing regardless of whether user names are case-sensitive. For example, in a setting in which user names are case-insensitive, when user names which include different uppercase and lowercase letters and are represented by the same character string are registered in the user DB 311, user name authentication processing and card authentication processing are performed differently as described below. That is, in the user name authentication processing, when a plurality of user names which includes different uppercase and lowercase letters, respectively, and is represented by the same character string is present, it is determined that an authentication error by such general users has occurred. On the other hand, in the card authentication processing, the authorisation of the general users respectively corresponding to such user names are allowed and the operation screen is displayed. Different card IDs are associated with such a plurality of user names, respectively, thereby enabling distinction of users, and thus there is no possibility of displaying an operation screen for each user that is different from the operation screen intended by the user.

Processing Flow in Icon Authentication Service

A processing flow in an icon authentication method will be described. In a case where the CPU 206 determines that the card authentication method is not set as the authentication method, in step S615, in step S619, the CPU 206 determines that the icon authentication method is set as the authentication method. In a case where it is determined that the icon authentication method is set, the CPU 206 executes processing from step S620 to step S622.

In step S620, the CPU 206 displays the selection screen 418 for selecting a user.

Then, in step S621, the CPU 206 performs the acceptance processing for accepting the selection of one of icon images displayed on the selection screen. In step S622, the CPU 206 determines whether the user name corresponding to the icon image selected from the user DB 311 is present (in S622). In a case where the user name corresponding to the selected icon image is not present (NO in step S622), the processing returns to step S620. On the other hand, in a case where the user name corresponding to the selected icon image is present (YES in step S622), in step S614, the CPU 206 causes the operation screen 402 for the user corresponding to the user name to be displayed.

Examples of the case where the user name corresponding to the selected icon image is not present include a case where an account including the user name is deleted by the administrator user before execution of the icon authentication service.

In the authentication processing by the icon authentication service, the authentication processing is performed using an icon image, thereby enabling the authentication processing regardless of whether a user name is case-sensitive. For example, in a setting in which user names are case-insensitive, when user names which include different uppercase and lowercase letters, respectively, and are represented by the same character string are registered in the user DB 311, the user name authentication processing and the icon authentication processing are performed differently as described below. That is, when a plurality of user names which includes different uppercase and lowercase letters, respectively, and is represented by the same character string is present, it is determined that a general user authentication error has occurred. On the other hand, in the icon authentication processing, the authorisation of general users respectively corresponding to such user names are allowed and the operation screen is displayed. Different icon images are associated with such a plurality of user names, respectively, thereby enabling distinction of users, and thus there is no possibility of displaying an operation screen for each user that is different from the operation screen intended by the user.

The processing described above enables the printing apparatus 100 to authenticate a user and cause the display unit to display the operation screen corresponding to the user who has been successful in authentication.

Moreover, according to the present exemplary embodiment, the printing apparatus 100 can prevent display of an operation screen for each user that is different from the operation screen intended by the user who has input the user name.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the above has been described with reference to exemplary embodiments, it is to be understood that this is not limited to the disclosed exemplary embodiments. The scope of the following claims is to be accorded the broadest interpretation so as to encompass all such modifications and equivalent structures and functions.

This application claims the benefit of Japanese Patent Application No. 2017-138340, filed Jul. 14, 2017, which is hereby incorporated by reference herein in its entirety.

What is claimed is:

1. An information processing apparatus comprising:
a memory device that stores a set of instructions; and
at least one processor that executes the set of instructions to:
set one of a first setting and a second setting, wherein in a case where the first setting is set, upper case letters and lower case letters of user information are distinguished, and, in a case where the second setting is set, upper case letters and lower case letters of user information are not distinguished;
accept, upon registration of user identification information in a database based on the setting, an input of the user identification information;
cause a display to display an operation screen corresponding to the accepted user identification information in a case where the accepted user identification information corresponds to the user identification information registered in the database; and
restrict, in a case where a plurality of pieces of identification information registered in the database had been treated as a plurality of pieces of identification information of a plurality of users in a state where the first setting had set and are treated as identification information of the same user in a state where the second setting is set, the display of the operation screen upon acceptance of any one of the plurality of pieces of identification information in the state where the second setting is set.

2. The information processing apparatus according to claim 1, wherein the at least one processor executes instructions in the memory device to control, in a case where any one of the plurality of pieces of identification information is registered in the database as identification information about an administrator of the information processing apparatus, the display to display an operation screen corresponding to the identification information about the administrator based on an acceptance of the identification information about the administrator and authentication, information about the administrator even in a state where the second setting is set.

3. The information processing apparatus according to claim 1, further comprising a storage including a database stored therein, the database having user identification information and identification information stored in the memory device in association with each other, wherein the at least one processor executes instructions in the memory device to:

acquire, from a mobile device, identification information stored in the mobile device;

accept identification information about a user who has input the identification information on an input screen displayed on the display;

perform first authentication control for performing first authentication based on the identification information about the user who has input the identification information on the input screen displayed on the display;

perform second authentication control for performing second authentication based on the identification information acquired from the mobile device; and control, in a case where the second authentication is successful based on the identification information associated with any one of the plurality of pieces of identification information acquired from the mobile device in a state where the second setting is set, the display to display the operation screen corresponding to the identification information acquired from the mobile device.

4. The information processing apparatus according to claim 3, wherein the mobile device is one of an IC card and a mobile terminal including an integrated circuit.

5. The information processing apparatus according to claim 3, wherein the at least one processor executes instructions to acquire identification information from the mobile device by near-field communication.

6. The information processing apparatus according to claim 1, wherein the at least one processor executes instructions in the memory device to:

perform display control for causing the display to display an input screen for a user to input identification information about the user;

perform display control for causing the display to display a selection screen for the user corresponding to the identification information registered in the database;

perform acceptance processing for accepting the identification information about the user who has input the identification information on the input screen displayed on the display;

perform acceptance processing for accepting selection of a user using the selection screen by the user;

perform first authentication control for performing first authentication based on the identification information about the user who has input the identification information on the input screen displayed on the display;

perform third authentication control for performing third authentication based on the identification information about the user selected using the selection screen; and control, in a case where the third authentication is successful based on the identification information associated with any one of the plurality of pieces of identification information about the user selected using the selection screen in a state where the second setting is set, the display to display the operation screen corresponding to the identification information about the user selected using the selection screen.

7. A control method for an information processing apparatus, the control method comprising:

setting one of a first setting and a second setting, wherein in a case where the first setting is set, upper case letters and lower case letters of user information are distinguished, and, in a case where the second setting is set, upper case letters and lower case letters of user information are not distinguished;

registering user identification information in a database based on the setting;

accepting an input of the user identification information;

causing a display to display an operation screen corresponding to the accepted user identification information in a case where the accepted user identification information corresponds to the user identification information registered in the database; and restricting, in a case where a plurality of pieces of identification information registered in the database had been treated as a plurality of pieces of identification information of a plurality of users in a state where the first setting had set and are treated as identification information of the same user in a state where the second setting is set, the display of the operation screen upon acceptance of any one of the plurality of pieces of identification information in the state where the second setting is set.

8. A non-transitory computer readable storage medium storing a program for causing a processor to execute a method of controlling an information processing apparatus, the method comprising:

setting one of a first setting and a second setting, wherein in a case where the first setting is set, upper case letters and lower case letters of user information are distinguished, and, in a case where the second setting is set, upper case letters and lower case letters of user information are not distinguished;

registering user identification information in a database based on the setting;

accepting an input of the user identification information;

causing a display to display an operation screen corresponding to the accepted user identification information in a case where the accepted user identification information corresponds to the user identification information registered in the database; and restricting, in a case where a plurality of pieces of identification information registered in the database had been treated as a plurality of pieces of identification information of a plurality of users in a state where the first setting had set and are treated as identification information of the same user in a state where the second setting is set, the display of the operation screen upon acceptance of any one of the plurality of pieces of identification information in the state where the second setting is set.

* * * * *